United States Patent [19]
Ressl et al.

[11] Patent Number: 5,493,579
[45] Date of Patent: Feb. 20, 1996

[54] LASER SYSTEM WITH COLLINEAR PROCESS AND ALIGNMENT BEAMS

[75] Inventors: Michael G. Ressl, Western Springs; Douglas W. Anthon, Wheaton, both of Ill.

[73] Assignee: Coherent, Inc., Santa Clara, Calif.

[21] Appl. No.: 214,406

[22] Filed: Mar. 16, 1994

[51] Int. Cl.[6] .................................................. H01S 3/08
[52] U.S. Cl. .............................................. 372/107; 372/21
[58] Field of Search .................................. 372/21, 22, 107

[56] References Cited

U.S. PATENT DOCUMENTS

| | | | |
|---|---|---|---|
| 4,884,277 | 11/1989 | Anthon et al. | 372/21 |
| 4,914,658 | 4/1990 | Stankov et al. | 372/21 |
| 5,047,668 | 9/1991 | Bosenberg | 372/21 |
| 5,144,630 | 9/1992 | Lin | 372/21 |
| 5,237,578 | 8/1993 | Amano | 372/22 |
| 5,247,389 | 9/1993 | Beausoleil | 372/21 |

*Primary Examiner*—Leon Scott, Jr.

[57] ABSTRACT

Apparatus for providing a visible or viewable alignment beam for an invisible process beam, wherein the beam generating elements are arranged in a tandem configuration to improve alignment and stability.

5 Claims, 3 Drawing Sheets

5,493,579

LASER SYSTEM WITH COLLINEAR PROCESS AND ALIGNMENT BEAMS

FIELD OF THE INVENTION

The invention relates to laser systems that use a visible or viewable alignment beam to target and position an invisible process beam, and more specifically to laser systems that combine the alignment and process beams together for targeting and positioning operations.

BACKGROUND OF THE INVENTION

Many laser systems employ process beams that have radiation wavelengths that are outside of the visible range of radiation wavelengths that extends from approximately 450 to 750 nanometers. The process beams for such laser systems are used, for instance, in photolithography applications for the fabrication of microminiature structures, such as integrated circuits, wherein the process beam is ultraviolet, and in medical applications, wherein the process beam is infrared.

The targeting and positioning of such invisible process beams present special problems with respect to monitoring and controlling process beam spot size and position on a work area, particularly if the process beam must be moved across the work area during a processing operation. To allow adjustment of the process beam spot size and realignment of the process beam position during a processing operation, it is common practice to optically combine the beam of a visible laser, or the beam of an invisible laser that is viewable with a device such as a CCD video camera, with the process beam in such a manner that both beams have a similar spot size and position on the work area. They are also combined in such a way that any adjustment to the visible beam spot size or position causes a substantially corresponding change in spot size or position to the process beam.

Laser systems that incorporate such visible alignment beam provisions are generally bulky, complex, and unstable because of the number of optical elements that are used to combine the beams. For instance, the laser for the process beam generally has a lens assembly for converging and shaping its beam and the laser for the alignment beam has an independent lens assembly for converging and shaping its beam. The independent lens assemblies are generally necessary because of the different radiation wavelengths of the two beams as well as a probable difference in different divergences for each of the two beams from their laser sources to the work area.

Some means for combining the process and alignment beams is also necessary, such as with one or more totally reflective mirrors and a dichroic mirror, or a similar arrangement. An achromatic lens assembly may also be used to change the convergence and shape of the combined beams before they reach the work area. The change in position or disturbance of the dimensions of any of these elements, such as caused by thermal expansion or contraction, can cause misalignment of the entire laser system. Such misalignment can cause damage to the work area as well as cause excessive time loss during realignment of the laser system.

It is therefore desirable to use a laser system with an invisible process beam and a visible alignment beam that has fewer optical elements and is less prone to misalignment.

SUMMARY OF THE INVENTION

The invention comprises a laser source that generates a first beam that has a first radiation wavelength and at least one non-linear element positioned in the optical path of the first beam to generate at least a second beam that has a second beam radiation wavelength and is propagated substantially down the optical path of the first beam, wherein one of the beams is visible or viewable and serves as an alignment beam, and the other one of the beams is invisible and serves as a process beam.

DESCRIPTION OF EMBODIMENTS

Figure 1:
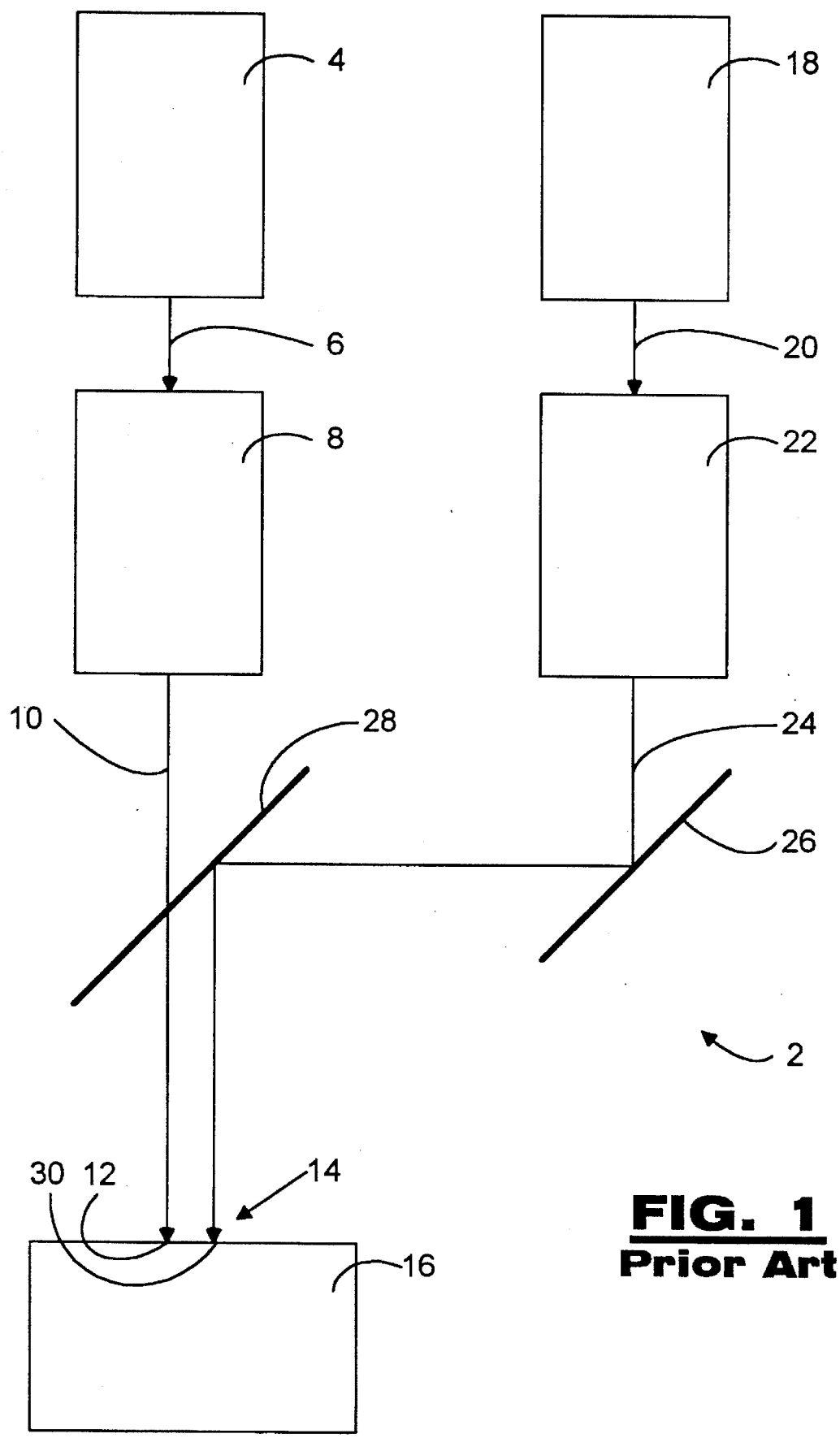
FIG. 1 shows a typical laser system according to the prior art.

Referring to the drawings, wherein reference numbers refer to like or corresponding parts throughout the views, FIG. 1 shows a typical laser system 2 according to the prior art that combines a visible alignment beam with an invisible process beam. The laser system 2 comprises a first laser 4 that has a first output beam radiation of a first wavelength that follows a beam path 6 into a lens assembly 8. The lens assembly 8 converges the first output beam along a beam path 10 to form a spot 12 of desired size, shape and position on a work area 14 of a work piece 16.

The laser system 2 also comprises a second laser 18 that has a second output beam radiation of a second wavelength that follows a beam path 20 into a lens assembly 22. The lens assembly 22 converges the second output beam along a beam path 24 to form a spot 30 of desired size, shape and position on the work area 14 that is generally registered and coincident with the spot 12.

Along the path 24, the second output beam is reflected off of a highly reflective mirror 26, and then reflected off of a dichroic mirror 28 that is highly reflective for second wavelength radiation and highly transmissive for first wavelength radiation. The mirror 26 and the dichroic mirror 28 are positioned so that the first output beam 10 is transmitted through the dichroic mirror 28 to the work area 14 and the second output beam is reflected from the dichroic mirror 28 to the work area 14.

It is evident that a shift in either of the lens assemblies 8, 22 or mirrors 26, 28 can cause a non-registration of the spots 12, 30 with each other. Either the first output beam of the first laser 4 or the second output beam of the second laser 22 can be the invisible process beam in the laser system, and the other beam is the visible or viewable alignment beam.

Figure 2:
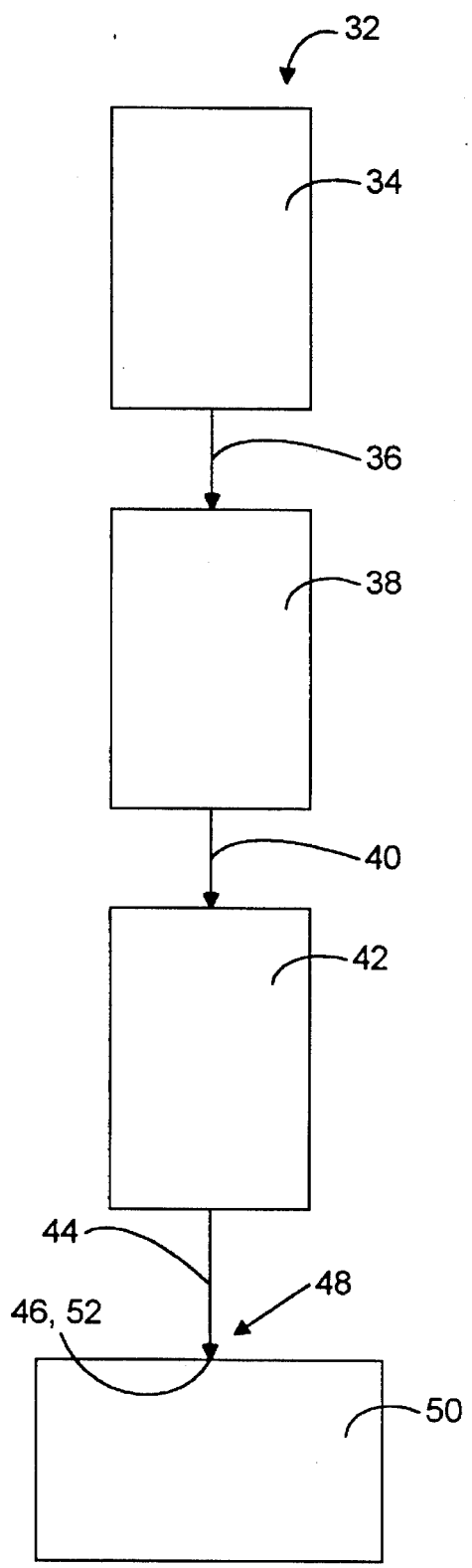
FIG. 2 shows a first embodiment of a laser system according to the invention.

FIG. 2 shows a laser system 32 according to one embodiment of the invention. A laser source 34 generates a source radiation beam of a first wavelength along a beam path 36 into a lens assembly 38. The lens assembly 38 converges and shapes the source radiation beam as desired. The source radiation beam exits the lens assembly 38 along a beam path 40 into a non-linear element 42. The non-linear properties of the non-linear element 42 cause the generation of at least one secondary output radiation beam along a beam path 44 due to the transmission of the source radiation beam through the non-linear element 42. The wavelength of the secondary radiation beam is generally a harmonic of the wavelength of the source beam. The source beam also propagates substantially along the beam path 44 after it passes through the non-linear element 42.

The secondary radiation beam propagates along the beam path 44 to form an invisible spot 46 on a work area 48 of a workpiece 50. The source radiation beam also propagates substantially along the beam path 44 to form a visible or viewable spot 52 that generally registers and coincides with the invisible spot 46 that is formed by the secondary radiation beam so that the visible spot 52 may be used for alignment of the invisible spot 46. The lens assembly 38 may be adjusted in position and focus to achieve the desired registration and convergence of the spots 46, 50 on the work area 48.

For instance, if the laser source 34 generates the source radiation beam that has the first wavelength of about 532 nanometers, the non-linear element 42 may be positioned to intercept the source beam path 40 to cause the non-linear properties of the non-linear element 42 to generate a harmonic of the source radiation beam of the laser source 34 that is transmitted through it. Thus, if the non-linear element 42 generates the second harmonic of the source radiation beam, the secondary radiation beam will have a wavelength of approximately 266 nanometers.

In this case, the source radiation beam has a wavelength of approximately 532 nanometers and serves as a visible alignment beam for the invisible secondary radiation beam that has a wavelength of approximately 266 nanometers and is used as a process beam. Since the source radiation beam is used as an alignment beam to indicate the approximate size, position, or both, of the invisible secondary radiation beam that is used as the process beam, it should be noted that because the visible source radiation beam is transmitted through the non-linear element 42, either the non-linear element 42 should be relatively transparent for the source radiation beam or the laser source 34 should have enough power to generate the source beam radiation with enough intensity to sufficiently overcome the absorption in the non-linear element 42 for alignment purposes.

Alternatively, the source radiation beam that is generated by the laser source 34 may be used as a process beam, wherein it may have a an invisible infrared wavelength, such as approximately 1064 nanometers. In this case, the secondary radiation beam that is generated in the non-linear element 42 may have a visible wavelength that corresponds to the second harmonic of the source radiation beam, approximately 532 nanometers, in which case the secondary radiation beam is used as the visible alignment beam.

The laser source 34 may comprise, for example, a laser diode or a diode-pumped solid state laser. The non-linear element 28 may comprise KDP, KTP, BBO or any other non-linear material that will pass both the source radiation beam of the laser source 34 and produce the secondary radiation beam with a wavelength that corresponds to the desired harmonic of the source radiation beam wavelength. The non-linear element 28 may also comprise more than one component of non-linear material if desired, such as to control the well-known "walk-off" effects that are encountered with most non-linear materials.

Likewise, the lens assembly 38 may, and often preferably does, comprise a plurality of optical elements, such as lenses, that are arranged to register and converge the spot 52 formed by the source radiation beam with the spot 46 formed by the secondary radiation beam on the work area 48. Of course, the lens assembly 38 is generally adjusted to provide a focal point midway through the non-linear element 42 with a desired focal point cross-sectional area to maximize harmonic generation efficiency.

Figure 3:
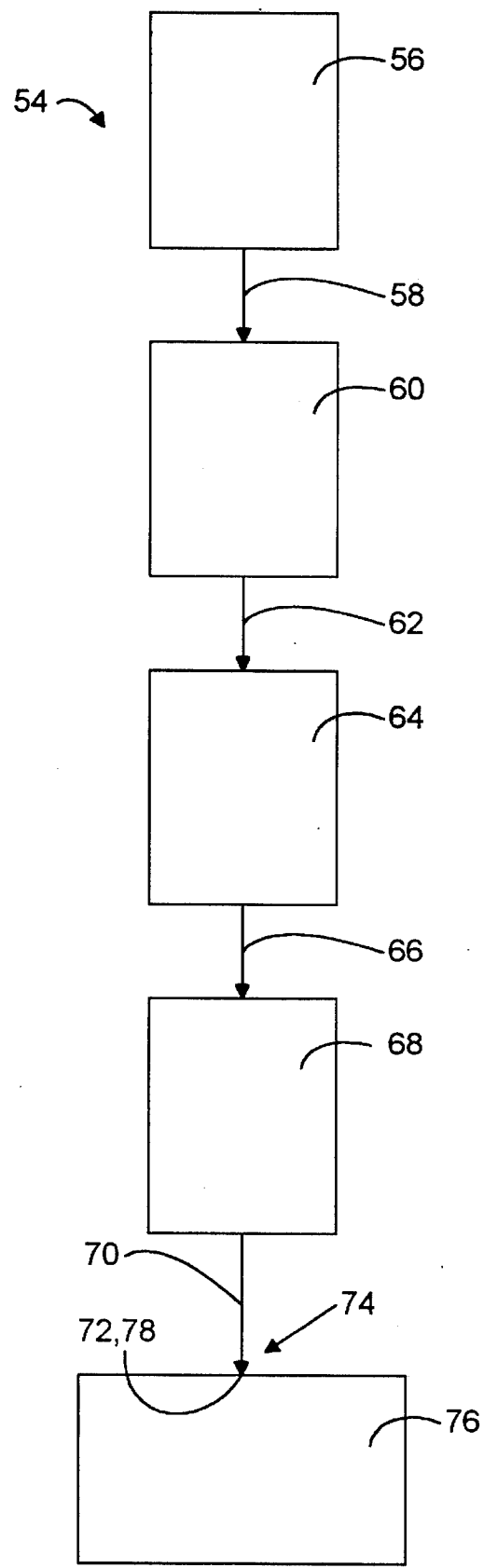
FIG. 3 shows an alternate embodiment of a laser system according to the invention.

FIG. 3 shows a laser system 54 that may be used when the wavelength of radiation from a laser source 56 is too long to be visible as an alignment beam. In this case, the laser source 56 generates a source radiation output beam that has a radiation wavelength in the infrared region and that propagates along a beam path 58 into a first non-linear element 60. As the source radiation beam passes through the non-linear element 60, the non-linear properties of the non-linear element 60 cause the source radiation beam to generate a secondary radiation output beam that has a visible wavelength that corresponds to a harmonic of the source radiation beam wavelength and that propagates substantially along a beam path 62. The source radiation beam also propagates substantially along the beam path 62 after it passes through the first non-linear element 60.

The secondary radiation beam and the source radiation beam propagates along the beam path 62 to pass through a lens assembly 64. The lens assembly 64 serves to converge, shape and position at least the secondary radiation beam, and also the source radiation beam, if desired. After exiting the lens assembly 64, the secondary radiation beam and the source radiation beam propagate substantially along a beam path 66 to enter a second non-linear element 68.

At this point, the non-linear element 68 may be adjusted to generate a tertiary radiation output beam that corresponds to a variety of different possible wavelengths. For instance, the non-linear properties of the non-linear element 68 may cause the combination of the source radiation beam and the secondary radiation beam to generate at least one wavelength for the tertiary radiation beam that corresponds to the sum of the frequencies of the source radiation beam and the secondary radiation beam, the difference of the frequencies of the source radiation beam and the secondary radiation beam, or one or more harmonics of the secondary radiation beam, the source radiation beam, or both.

For instance, if the laser source 56 generates the source radiation beam with a wavelength of approximately 1064 nanometers, and the secondary radiation beam has a wavelength that corresponds to the second harmonic of the source radiation beam, approximately 532 nanometers, the tertiary radiation beam may typically have a wavelength that corresponds to the second harmonic of the secondary radiation beam, approximately 266 nanometers. Alternatively, the tertiary radiation beam may have a wavelength that corresponds to the sum of the frequencies of the source radiation beam and the secondary radiation beam, approximately 355 nanometers. In either case, the secondary radiation beam serves as the visible or viewable alignment beam and the tertiary radiation beam serves as the invisible process beam. Alternatively, the source radiation beam may be used as the invisible process beam, or both the source radiation beam and the tertiary radiation beam may together serve as the invisible process beam.

The invisible tertiary radiation process beam exits the second non-linear element 68 and propagates substantially along a beam path 70 to form an invisible spot 72 on a work area 74 of a work piece 76. Likewise, at least the visible secondary radiation alignment beam exits the second non-linear element 68 and propagates substantially along the beam path 70 to form a visible spot 78 on the work area 74 of the work piece 76 that substantially registers and coincides with the invisible spot 72. In this way, the visible spot 78 serves as an indicator of alignment for the invisible spot 72 of the tertiary process beam on the work area 74.

Figure 4:
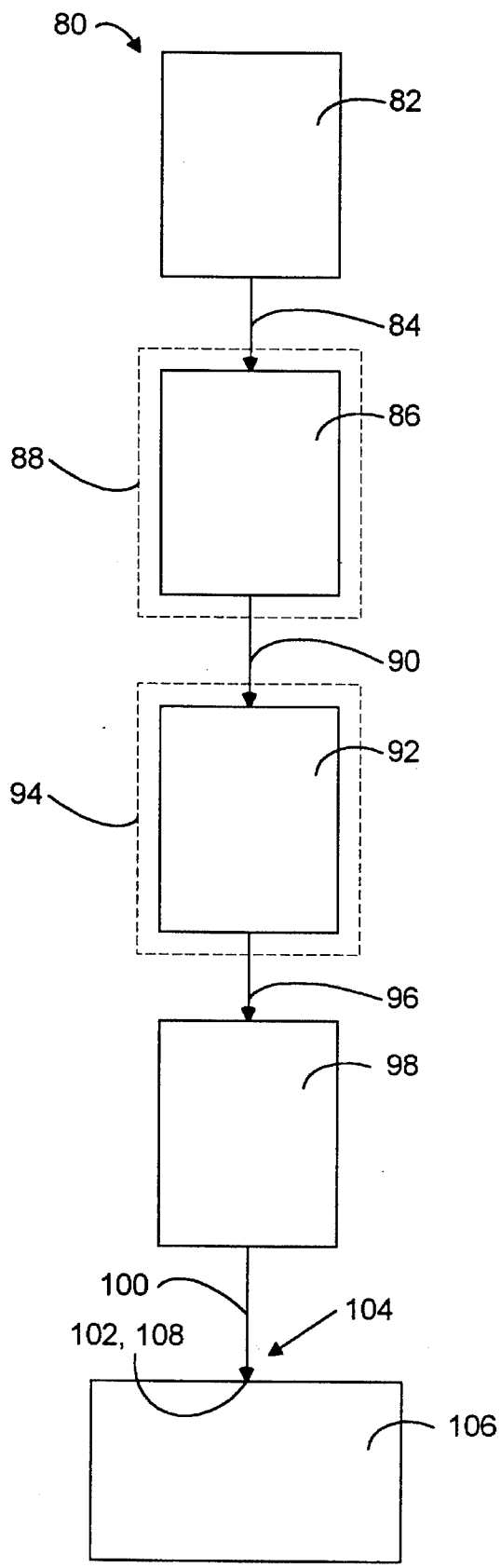
FIG. 4 shows another alternate embodiment of a laser system according to the invention.

FIG. 4 shows a laser system 80 according to yet another embodiment of the invention. A laser source 82 generates a source radiation beam of a first wavelength that is propagated along a beam path 84 into a first lasant material 86. The lasant material 86 is stimulated by the source radiation beam to radiatively fluoresce, and at least a portion of the fluorescent radiation is resonated in an associated first optical cavity 88 that is coupled to the lasant material 86 to generate a secondary radiation beam of a second wavelength.

The source radiation beam and the secondary radiation beam are both propagated substantially along an optical path 90 into a second lasant material 92. The second lasant material 92 is stimulated by the source radiation beam, the secondary radiation beam, or both, to radiatively fluoresce, and at least a portion of the fluorescent radiation is resonated in an associated second optical cavity 94 that is coupled to the second lasant material 92 to generate a tertiary radiation beam of a third wavelength.

The source radiation beam, the secondary radiation beam and the tertiary radiation beam are propagated substantially along an optical path 96 into a non-linear element 98. The non-linear properties of the non-linear element 98 cause the generation of at least one quaternary output radiation beam due to the transmission of at least two of the three other radiation beams through the non-linear element 98.

The quaternary radiation beam is propagated along an optical path 100 to form a spot 102 on a work area 104 of a work piece 106. At least one of the other three radiation beams is also propagated along the optical path 102 to form a spot 108 on the work area 104 that substantially registers and coincides with the spot 102.

The quaternary radiation beam may correspond to the sum or difference of any pair of the other radiation beams that are transmitted through the non-linear element 98, or any harmonic of the other radiation beams. For example, if the source radiation of the laser source 84 generates the source radiation beam with a radiation wavelength of approximately 810 nanometers, the first lasant material 86 generates the secondary radiation beam with a radiation wavelength of approximately 1064 nanometers, and the second lasant material 92 generates the tertiary radiation beam with a radiation wavelength of approximately 1535 nanometers, the quaternary beam may have a wavelength that corresponds to the difference of the frequencies of the secondary and tertiary radiation beams, so that the wavelength of the quaternary radiation beam is approximately 3467 nanometers. Typically, quaternary beam is the invisible process beam in this example, and the viewable beam is the source radiation beam or the secondary radiation beam, with the assistance of a near-infrared viewing device, such as a CCD imaging device.

Alternatively, the quaternary radiation beam may correspond to the difference of a different pair of the other three radiation beams, the sum of the frequencies of any pair of the other three radiation beams, or the harmonics of any of them, depending on the desired process and alignment beam wavelengths. It should be noted that one, or both, of the two lasant materials 86, 92 may lase at distinctly separate wavelengths, so that a single one of the lasant materials 86, 92 may produce two or more radiation beams that may themselves interact in the non-linear element 98 to provide still other wavelengths for the quaternary radiation beam.

The tandem arrangement of components of the embodiments described above greatly simplify and improve alignment and stability of the laser systems described above. Of course, other tandem combinations of process and alignment beam generation elements and wavelengths can also be used. The embodiments described above are only specific examples of the invention, wherein a laser source and one or more non-linear elements are arranged in a tandem optical path to generate at least one invisible process beam and at least one visible or viewable alignment beam. The embodiments described above should not be construed as limiting the scope of the invention because they are only made as specific examples of the implementation of the invention as claimed. It should be understood that various changes in the details, parts, materials, processing and fabrication of the invention as described above may be made while remaining within the scope of the claimed invention.

What is claimed is:

1. Apparatus for providing an alignment beam with a visible wavelength selected from a range of wavelengths extending from approximately 450 to 750 nanometers for a process beam with an invisible wavelength selected from a range of wavelengths less than approximately 450 nanometers that comprises:

a laser source that generates a source radiation beam that has a source radiation wavelength in said visible wavelength range and propagates said source radiation beam along a substantially linear optical path; and at least one non-linear element that is positioned downstream from said laser source along said linear optical path for generating at least a secondary radiation beam that propagates substantially along said linear optical path and has a secondary radiation wavelength in said invisible wavelength range that corresponds to a harmonic of said source radiation wavelength.

2. Apparatus for providing an alignment beam with a visible wavelength selected from a range of wavelengths extending from approximately 450 to 750 nanometers for a process beam with an invisible wavelength selected from a range of wavelengths greater than approximately 750 nanometers that comprises:

a laser source that generates a source radiation beam that has a source radiation wavelength in said invisible wavelength range and propagates said source radiation beam along a substantially linear optical path; and at least one non-linear element that is positioned downstream from said laser source along said linear optical path for generating at least a secondary radiation beam that propagates substantially along said linear optical path and has a secondary radiation wavelength in said visible wavelength range that corresponds to a harmonic of said source radiation wavelength.

3. Apparatus for providing an alignment beam with a visible wavelength selected from a range of wavelengths extending from approximately 450 to 750 nanometers for a process beam with an invisible wavelength selected form a range of wavelengths less than approximately 450 nanometers that comprises:

a laser source that generates a source radiation beam that has a source radiation wavelength in said invisible wavelength range and propagates said source radiation beam along a substantially linear optical path;

at least one lasant element that is positioned downstream from said laser source along said linear optical path for generating a secondary radiation beam that propagates substantially down said linear optical path and has a second radiation wavelength; and at least one non-linear element that is positioned downstream from said at least one lasant element along said linear optical path for generating at least a tertiary radiation beam that has a tertiary radiation wavelength in said visible wavelength range that propagates substantially along said linear optical path and has a wavelength that corresponds to a wavelength selected from the group of wavelengths that correspond to the sum of the secondary radiation wavelength, the difference of the frequencies of said source radiation wavelength and said secondary radiation wavelength, and the harmonics of said source radiation wavelength and said secondary radiation wavelength.

4. Apparatus for providing a alignment beam with a visible wavelength selected from a range of wavelengths greater than approximately 450 to 750 nanometers for a process beam with an invisible wavelength selected from a range of wavelengths less than approximately 450 nanometers that comprises:

- a laser source that generates a source radiation beam that has a source radiation wavelength in said visible wavelength range and propagates said source radiation beam along a substantially linear optical path;
- at least one lasant element that is positioned downstream from said laser source along said linear optical path for generating a secondary radiation beam that propagates substantially down said linear optical path and has a second radiation wavelength; and
- at least one non-linear element that is positioned downstream from said at least one lasant element along said linear optical path for generating at least a tertiary radiation beam that has a tertiary radiation wavelength in said invisible wavelength range that propagates substantially along said linear optical path and has a wavelength that corresponds to a wavelength selected from the group of wavelengths that correspond to the sum of the secondary radiation wavelength, the difference of the frequencies of said source radiation wavelength and said secondary radiation wavelength, and the harmonics of said source radiation wavelength and said secondary radiation wavelength.

5. Apparatus for providing an alignment beam with a visible wavelength selected from a range of wavelengths between approximately 450 and 750 nanometers for a process beam with an invisible wavelength selected from a range of wavelengths less than approximately 450 nanometers and greater than 750 nanometers that comprises:

- a laser source that generates a source radiation beam that has a source radiation wavelength in said invisible range greater than approximately 750 nanometers and propagates said source radiation beam along a substantially linear optical path;
- a first non-linear element that is positioned downstream from said laser source along said linear optical path for generating a secondary radiation beam in said visible wavelength range that propagates substantially down said linear optical path and has a second radiation wavelength; and
- at least a second non-linear element that is positioned downstream from said first non-linear element along said linear optical path for generating at least a tertiary radiation beam that has a tertiary radiation wavelength in said invisible wavelength range less than approximately 450 nanometers that propagates substantially along said linear optical path and has a wavelength that corresponds to a wavelength selected from the group of wavelengths that correspond to the sum of the secondary radiation wavelength, the difference of the frequencies of said source radiation wavelength and said secondary radiation wavelength, and the harmonics of said source radiation wavelength and said secondary radiation wavelength.

* * * * *